United States Patent
Zhu

(10) Patent No.: US 11,014,592 B2
(45) Date of Patent: May 25, 2021

(54) COLLAPSIBLE CART WITH FABRIC IN RECEIVING SPACE

(71) Applicant: Shou Qiang Zhu, Ontario, CA (US)

(72) Inventor: Shou Qiang Zhu, Ontario, CA (US)

(*) Notice: Subject to any disclaimer, the term of this patent is extended or adjusted under 35 U.S.C. 154(b) by 0 days.

(21) Appl. No.: 16/517,522

(22) Filed: Jul. 19, 2019

(65) Prior Publication Data
US 2020/0023875 A1    Jan. 23, 2020

Related U.S. Application Data

(60) Provisional application No. 62/700,657, filed on Jul. 19, 2018.

(51) Int. Cl.
  *B62B 1/00*     (2006.01)
  *B62B 3/02*     (2006.01)
  *B62B 5/06*     (2006.01)

(52) U.S. Cl.
  CPC .............. *B62B 3/02* (2013.01); *B62B 5/06* (2013.01); *B62B 2205/02* (2013.01); *B62B 2205/06* (2013.01); *B62B 2205/26* (2013.01)

(58) Field of Classification Search
  CPC .. B62B 3/02; B62B 3/00; B62B 3/002; B62B 3/005; B62B 3/007; B62B 3/027; B62B 3/025; B62B 3/022; B62B 5/06; B62B 2205/06; B62B 2205/02; B62B 2205/26; B62B 2205/00; B62B 2202/52; B62B 2202/66
  See application file for complete search history.

(56) References Cited

U.S. PATENT DOCUMENTS

| | | | | |
|---|---|---|---|---|
| 3,286,752 A * | 11/1966 | Duryee, Jr. | ............ | A47G 29/06 220/9.3 |
| 3,679,222 A * | 7/1972 | Guillamon | ................ | B62B 7/08 280/644 |
| 4,765,644 A * | 8/1988 | Bell | ........................ | B62B 3/027 280/33.992 |
| 6,019,381 A * | 2/2000 | Krawczyk | ............... | B62B 1/002 211/126.1 |
| 6,354,619 B1 * | 3/2002 | Kim | ........................ | B62B 3/106 280/649 |
| 7,017,939 B2 * | 3/2006 | Darling, III | ............ | B62B 1/002 280/652 |
| 7,281,731 B2 * | 10/2007 | Shamah | .................... | B62B 1/12 280/639 |

(Continued)

*Primary Examiner* — James M Dolak
(74) *Attorney, Agent, or Firm* — Che-Yang Chen; Law Office of Michael Chen

(57) ABSTRACT

A collapsible cart may include a first frame member, a second frame member, a front spacing member, a rear spacing member, and a base member. The front and rear spacing members are configured to separate the first frame member and the second frame member for a predetermined distance to create a receiving space for the cart when it is in a fully open status. The base member may have a plurality of base connecting bars and a center unit that has four opening to pivotally engage with the base connecting bars, and the center unit and the four base connecting bars are positioned on the same plane surface when the cart is in a fully open status. The user can start collapsing the cart by simply pushing down the center unit to disengage the center units with the base connecting bars.

5 Claims, 7 Drawing Sheets

(56) References Cited

U.S. PATENT DOCUMENTS

| | | | | |
|---|---|---|---|---|
| 8,162,349 | B1* | 4/2012 | Roselle | B62B 1/008 280/639 |
| 8,596,389 | B2* | 12/2013 | Anasiewicz | B62D 51/04 180/19.1 |
| 8,851,504 | B1* | 10/2014 | Goldszer | B62B 3/02 280/651 |
| 8,998,219 | B1* | 4/2015 | Sellers | B62B 5/067 280/35 |
| 9,937,946 | B1* | 4/2018 | Gillis | B62B 7/142 |
| 9,950,727 | B1* | 4/2018 | Pang | B62B 3/025 |
| 10,435,055 | B1* | 10/2019 | Zhu | B62B 3/025 |
| 10,604,170 | B1* | 3/2020 | Davis | B62B 3/02 |
| 10,696,314 | B1* | 6/2020 | Camarco | B62B 5/0003 |
| 10,722,761 | B2* | 7/2020 | Kohn | B62B 3/022 |
| 2002/0101065 | A1* | 8/2002 | McCollum | B62B 1/266 280/655 |
| 2008/0061524 | A1* | 3/2008 | Goldszer | B62B 3/02 280/47.34 |
| 2012/0274052 | A1* | 11/2012 | Zhu | B62B 3/027 280/651 |
| 2015/0145224 | A1* | 5/2015 | Zhu | B62B 3/025 280/42 |

* cited by examiner

COLLAPSIBLE CART WITH FABRIC IN RECEIVING SPACE

CROSS-REFERENCE TO RELATED APPLICATIONS

This application claims priority under 35 U.S.C. § 119 (e) to U.S. Provisional Patent Application Ser. No. 62/700,657, filed on Jul. 19, 2018, the entire contents of which are hereby incorporated by reference.

FIELD OF THE INVENTION

The present invention is directed to a collapsible and portable cart, and in particular to a collapsible cart that can be used to store and transported various items, and the size of the cart can be easily minimized when not in use.

BACKGROUND OF THE INVENTION

In recent years, more and more people love outdoor and recreational activities such as camping, field trips, or Bar-B-Q during their free time because many people may endure high pressure at work, and have accumulated a lot of tension and stress. Not only can these outdoor activities help people release the stress, but also improve quality of life. When people enjoy their outdoor activities, carts are primarily used for storing and transporting food, groceries and Bar-B-Q items, and even little child can be put therein.

Throughout the time, portable carts have been developed so the carts can be transported in a confined space (such as vehicle trunk), and quickly converted into a three-dimensional space supported by wheels to store and transport a plurality of items when arriving the outdoor destination such as parks, camping site, beaches, etc. U.S. Pat. No. 5,738,365 to McCarthy discloses a collapsible cart including a base member, first and second double L-shaped brackets, a pair of locking pins, and two locking bar members. The locking bar members and locking pins are utilized to lock the double L-shaped brackets into place when the cart is in the un-collapsed configuration.

U.S. Pat. No. 6,685,199 to Stravitz et al. discloses a collapsible frame which is readily folded up into a closed position having a narrow lateral profile and folded open back into the fully open position when needed. In the fully open position the cart will structurally support a storage container full of files or other items. No tools or other means are needed to fold up the cart into the folded position or to unfold the cart back into the fully open position.

However, the collapsible carts disclosed above may have too many conjugating points that would weaken the structure of the collapsible carts. It is also inconvenient for the user to engage/disengage every conjugating points when the user wants to use or store them. Therefore, there remains a need for a new and improved collapsible cart that is more convenient and efficient for the user to unfold or store without putting any additional or unnecessary burden on the users.

SUMMARY OF THE INVENTION

It is an object of the present invention to provide a collapsible cart that can be stored and moved more conveniently and efficiently without putting any additional or unnecessary burden on the users.

It is another object of the present invention to provide a collapsible cart, the size of which can be easily minimized so the user can easily transport the cart to any destination the user wants to go, and uses the cart in the destination, such as a camping spot, park, beach, etc.

In one aspect, a collapsible cart may include a first frame member, a second frame member, a front spacing member, a rear spacing member, and a base member. The front and rear spacing members are configured to separate the first frame member and the second frame member for a predetermined distance to create a receiving space for the cart when it is in a fully open status. In one embodiment, a fabric is disposed in the receiving space.

In one embodiment, the first frame member may include an elongated handle unit, a connecting unit extending from a rear end of the handle unit, and a supporting unit pivotally connecting to the connecting unit. More specifically, the connecting unit and the supporting unit are pivotally connected with each other to form an X-shaped structure at nearly a center portion of both the connecting and supporting units.

Likewise, the second frame member may include an elongated handle unit, a connecting unit extending from a rear end of the handle unit, and a supporting unit pivotally connecting to the connecting unit. More specifically, the connecting unit and the supporting unit are pivotally connected with each other to form an X-shaped structure at nearly a center portion of both the connecting and supporting units. It is noted that a front wheel is disposed at a rear end of the each of the first connecting unit and second connecting unit.

The front spacing member may include a first spacing unit and a second spacing member, which are pivotally connected with each other to form an X-shaped structure at a center portion of both the first and second spacing members. In one embodiment, one end of the first spacing unit is pivotally connected to an upper portion of the supporting unit of the second frame member and the other end of the first spacing unit is pivotally connected to a lower portion of the connecting unit of the first frame member. Likewise, one end of the second spacing unit is pivotally connected to an upper portion of the supporting unit of the first frame member and the other end of the first spacing unit is pivotally connected to a lower portion of the connecting unit of the second frame member.

The rear spacing member may include a first spacing unit and a second spacing member, which are pivotally connected with each other to form an X-shaped structure at a center portion of both the first and second spacing members. In one embodiment, one end of the first spacing unit is pivotally connected to an upper portion of the handle unit of the second frame member and the other end of the first spacing unit is pivotally connected to a lower portion of the supporting unit of the first frame member. Likewise, one end of the second spacing unit is pivotally connected to an upper portion of the handle unit of the first frame member and the other end of the first spacing unit is pivotally connected to a lower portion of the supporting unit of the second frame member.

It is noted that the handle unit and the connecting unit of the first frame member are connected through a conjugating unit, while the handle unit and the connecting unit of the second frame member are connected through a conjugating unit. The first frame member further includes a side supporting bar, one end of which is pivotally connected to the conjugating unit, and the other end of which is pivotally connected to the lower portion of the supporting unit. Likewise, the second frame member further includes a side supporting bar, one end of which is pivotally connected to the conjugating unit, and the other end of which is pivotally connected to the lower portion of the supporting unit.

The base member may have a plurality of base connecting bars and a center unit. The center unit has four openings to pivotally engage with one end of each base connecting bar, and the other end of each base connecting bar is pivotally connected to a lower portion of the connecting unit, the supporting unit of the first frame member, the connecting unit, and the supporting unit of the second frame member respectively. It is noted that when the cart in the present invention is in a fully open position, the four base connecting bars and the center unit should be positioned on the same plane surface.

When the user finishes using the cart, the size of the cart can be significantly reduced to just occupy a minimum space. More particularly, the structure of the cart starts to collapse when the center unit is pushed down to disengage with one end of the base connecting bars, so the four base connecting bars and the center unit are no longer on the same plane surface. Also, since the first frame member, the second frame member, the front spacing member, the rear spacing member and the base member are pivotally connected together in most parts, the cart can start to be folded when the first and second supporting units move towards the first and second handle units, and meanwhile the first supporting unit and the second supporting unit can move toward each other through the pivotal movement of the front spacing member while the first handle unit and the second handle unit can move toward each other through the pivotal movement of the second spacing member.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
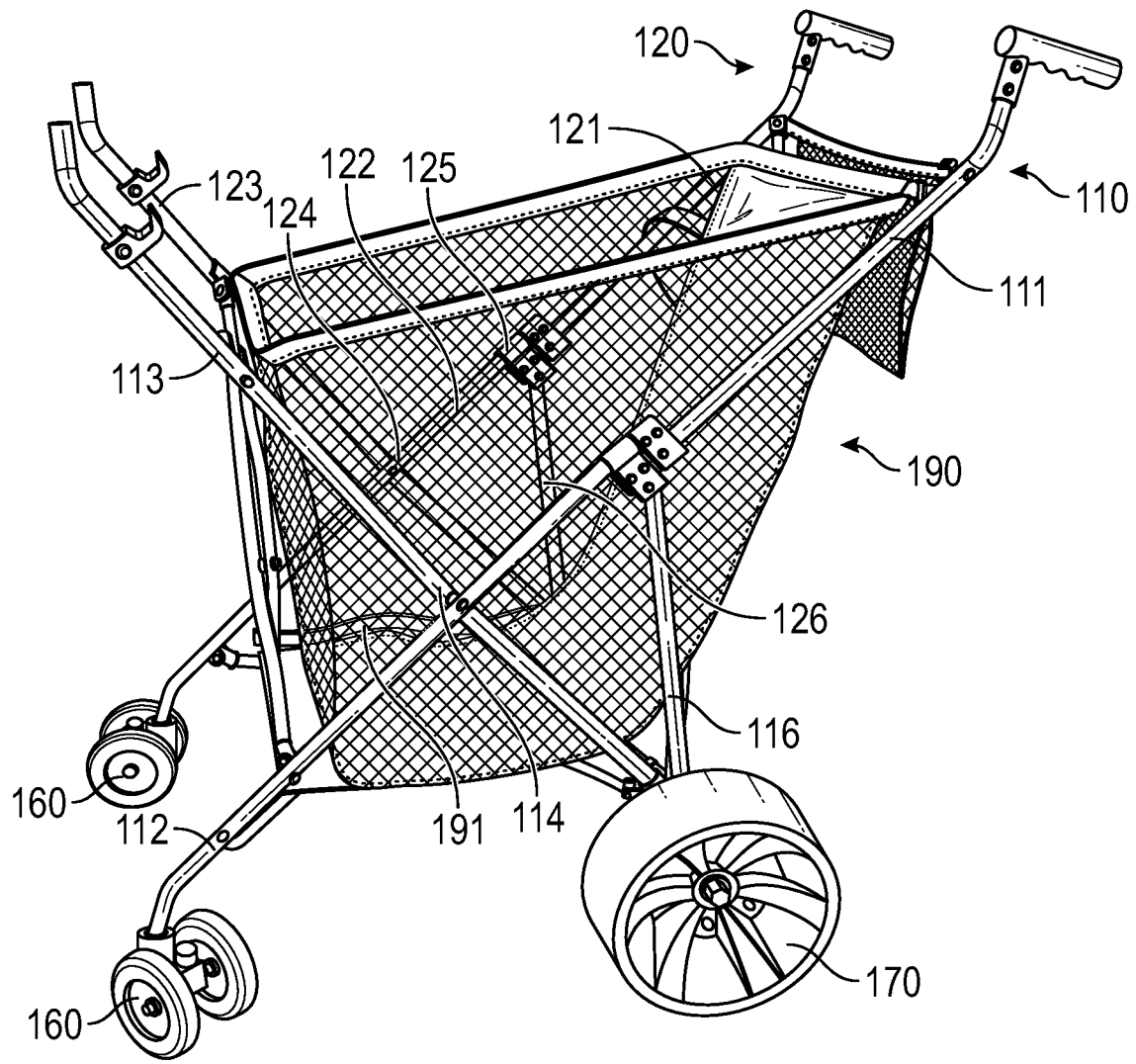
FIG. 1 illustrates a collapsible cart in a fully open status in the present invention.
Figure 2:
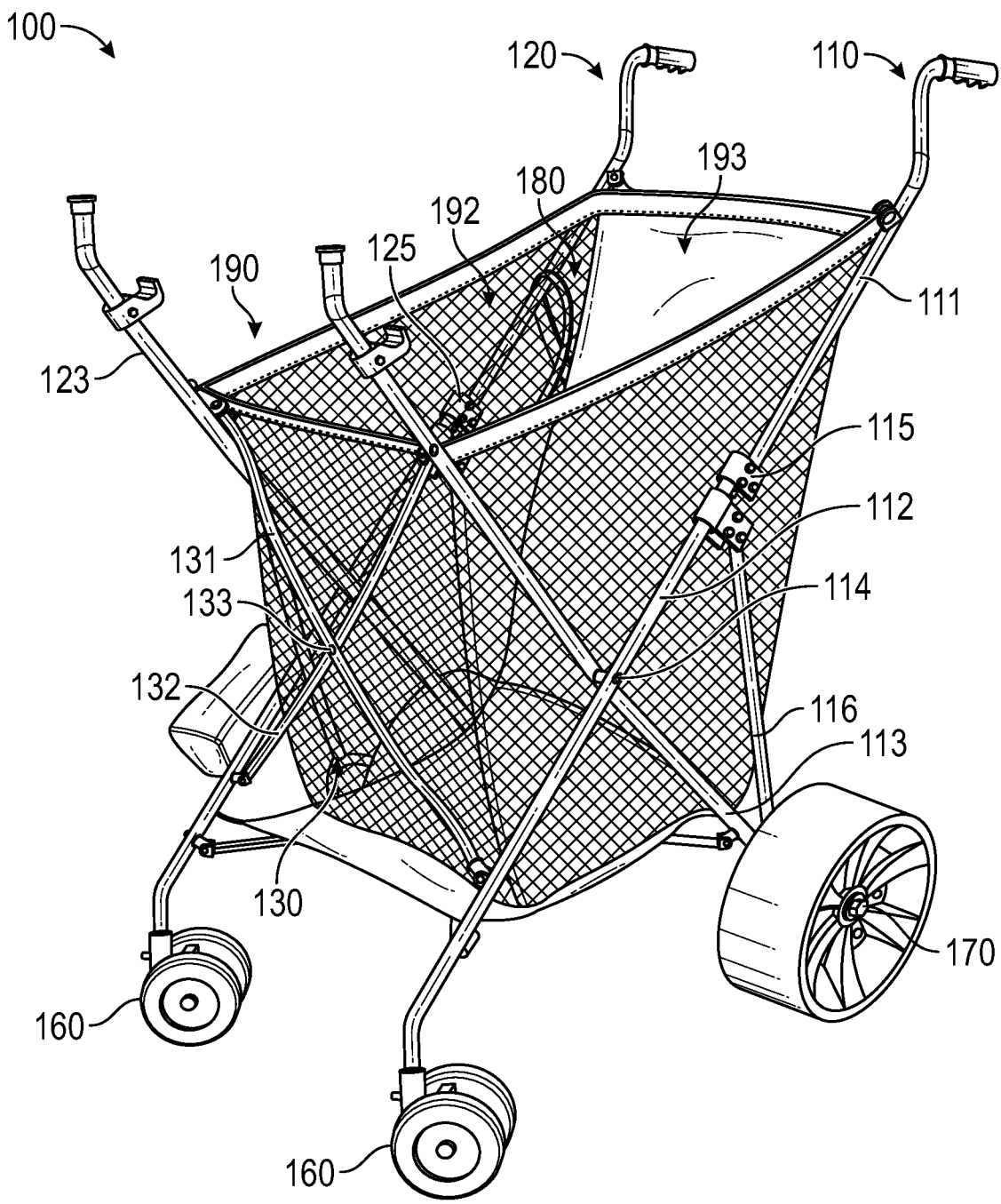
FIG. 2 illustrates the collapsible cart in a fully open status in the present invention from a different view angle.
Figure 3:
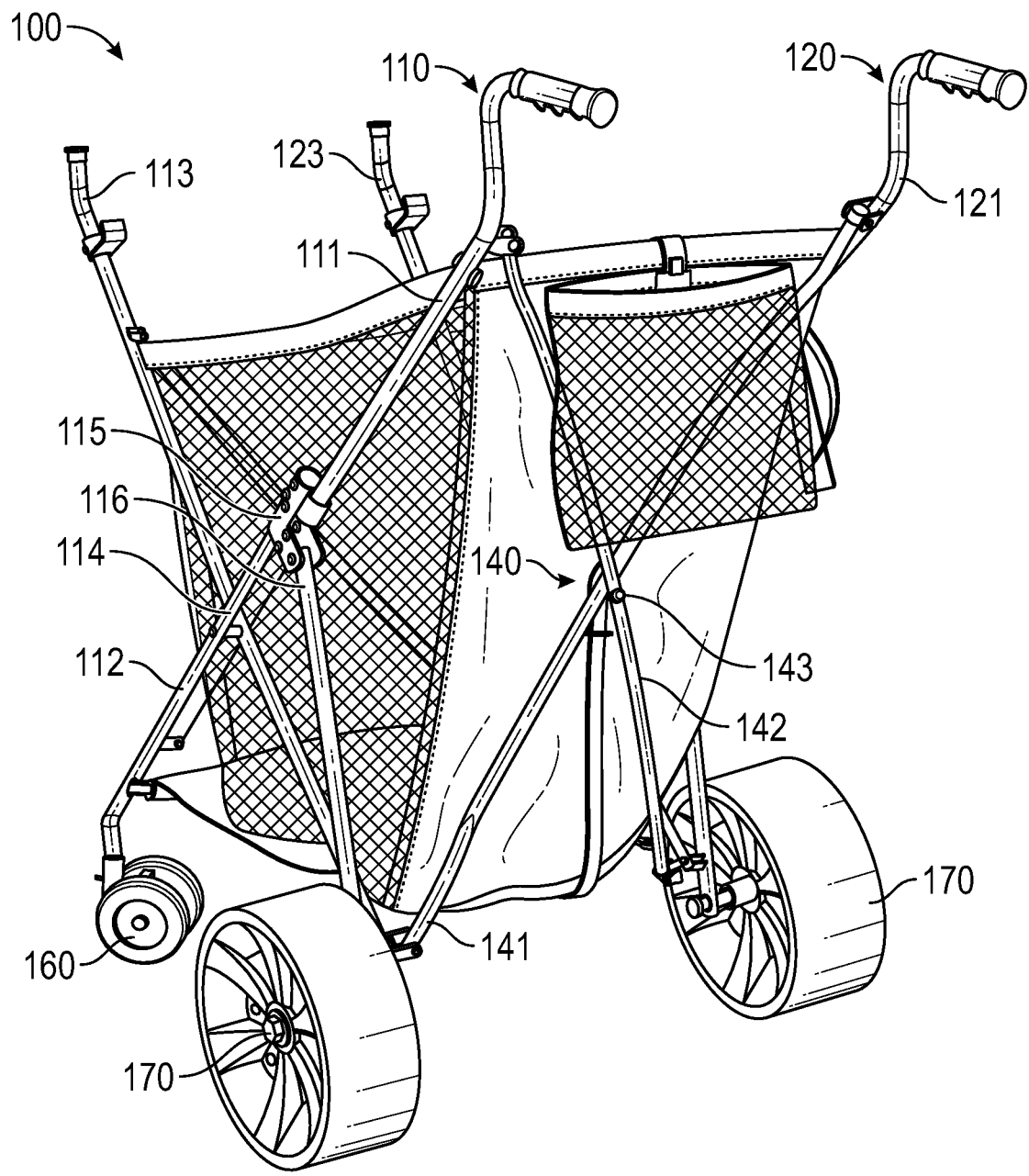
FIG. 3 illustrates the collapsible cart in a fully open status in the present invention from another view angle.

In order to further understand the goal, characteristics and effect of the present invention, a number of embodiments along with the drawings are illustrated as following:

In one aspect, as shown in FIGS. 1 to 3, a collapsible cart 100 may include a first frame member 110, a second frame member 120, a front spacing member 130, a rear spacing member 140, and a base member 150. The front and rear spacing members (130, 140) are configured to separate the first frame member 110 and the second frame member 120 for a predetermined distance to create a receiving space 180 for the cart when it is in a fully open status. In one embodiment, a fabric 190 is disposed in the receiving space 180, and the fabric 190 is attached to the first frame member 110 and the second frame member 120 respectively In one embodiment, the first frame member 110 may include an elongated handle unit 111, a connecting unit 112 extending from a rear end of the handle unit 111, and a supporting unit 113 pivotally connecting to the connecting unit 112. More specifically, the connecting unit 112 and the supporting unit 113 are pivotally connected with each other to form an X-shaped structure at nearly a center portion 114 of both the connecting and supporting units.

Likewise, the second frame member 120 may include an elongated handle unit 121, a connecting unit 122 extending from a rear end of the handle unit 121, and a supporting unit 123 pivotally connecting to the connecting unit 122. More specifically, the connecting unit 122 and the supporting unit 123 are pivotally connected with each other to form an X-shaped structure at nearly a center portion 124 of both the connecting and supporting units. It is noted that a front wheel 160 is disposed at a rear end of the each of the first connecting unit 112 and second connecting unit 122. It is also noted that the fabric 190 forms an inclined top opening 193 and two wedge-shaped surfaces (191, 192), one on the X-shaped structure of the first frame member 110, and the other on the X-shaped structure of the second frame member 120.

The front spacing member 130 may include a first spacing unit 131 and a second spacing member 132, which are pivotally connected with each other to form an X-shaped structure at a center portion 133 of both the first and second spacing members. In one embodiment, one end of the first spacing unit 131 is pivotally connected to an upper portion of the supporting unit 123 of the second frame member 120 and the other end of the first spacing unit 131 is pivotally connected to a lower portion of the connecting unit 112 of the first frame member 110. Likewise, one end of the second spacing unit 132 is pivotally connected to an upper portion of the supporting unit 113 of the first frame member 110 and the other end of the first spacing unit 132 is pivotally connected to a lower portion of the connecting unit 122 of the second frame member 120.

The rear spacing member 140 may include a first spacing unit 141 and a second spacing member 142, which are pivotally connected with each other to form an X-shaped structure at a center portion 143 of both the first and second spacing members. In one embodiment, one end of the first spacing unit 141 is pivotally connected to an upper portion of the handle unit 121 of the second frame member 120 and the other end of the first spacing unit 141 is pivotally connected to a lower portion of the supporting unit 113 of the first frame member 110. Likewise, one end of the second spacing unit 142 is pivotally connected to an upper portion of the handle unit 111 of the first frame member 110 and the other end of the first spacing unit 142 is pivotally connected to a lower portion of the supporting unit 123 of the second frame member 120.

It is noted that the handle unit 111 and the connecting unit 112 of the first frame member 110 are connected through a conjugating unit 115, while the handle unit 121 and the connecting unit 122 of the second frame member 120 are connected through a conjugating unit 125. The first frame member further includes a side supporting bar 116, one end of which is pivotally connected to the conjugating unit 115, and the other end of which is pivotally connected to the lower portion of the supporting unit 113. Likewise, the second frame member further includes a side supporting bar 126, one end of which is pivotally connected to the conjugating unit 125, and the other end of which is pivotally connected to the lower portion of the supporting unit 123. In one embodiment, a rear wheel 170 is disposed at a rear end of each of the side supporting bar 116 and 126.

Figure 4:
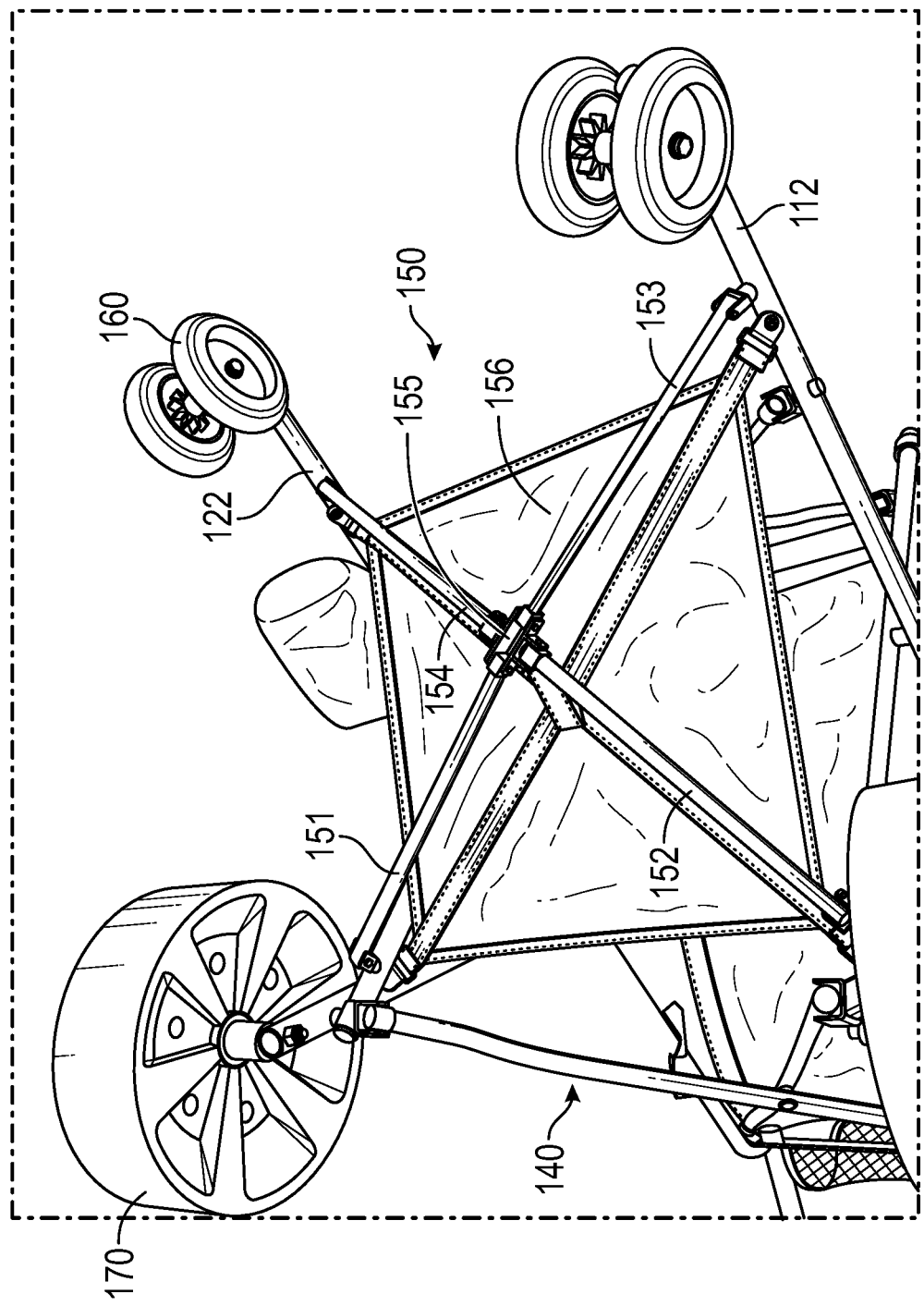
FIG. 4 illustrates the base member of the collapsible cart in the present invention when the cart is in a fully open status.

The base member 150 may have a plurality of base connecting bars (151, 152, 153, 154) and a center unit 155 as shown in FIG. 4. The center unit 155 has four openings to pivotally engage with one end of each base connecting bar, and the other end of each base connecting bar is pivotally connected to a lower portion of the connecting unit 112, the supporting unit 113 (of the first frame member 110), the connecting unit 122, and the supporting unit 123 (of the second frame member 120) respectively. It is noted that when the cart in the present invention is in a fully open position, the four base connecting bars (151 to 154) and the center unit 155 should be positioned on the same plane surface as shown in FIG. 4.

Figure 5:
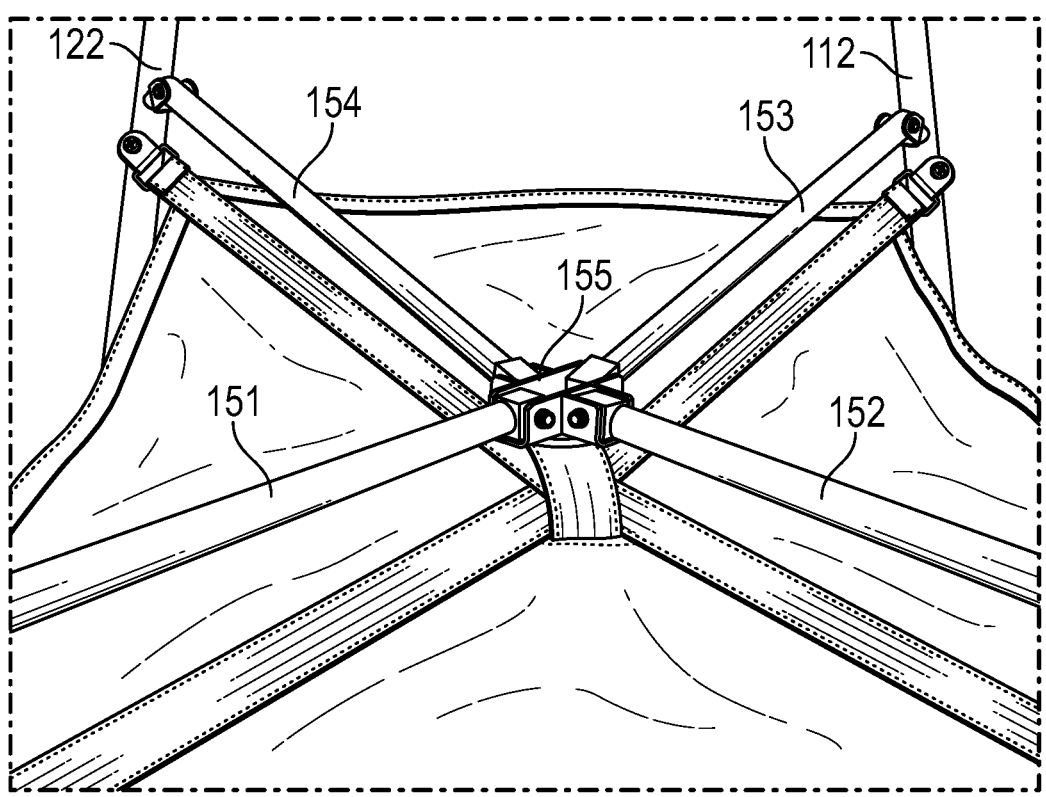
FIG. 5 illustrates the base member of the collapsible cart in the present invention when the cart starts to collapse.
Figure 6:
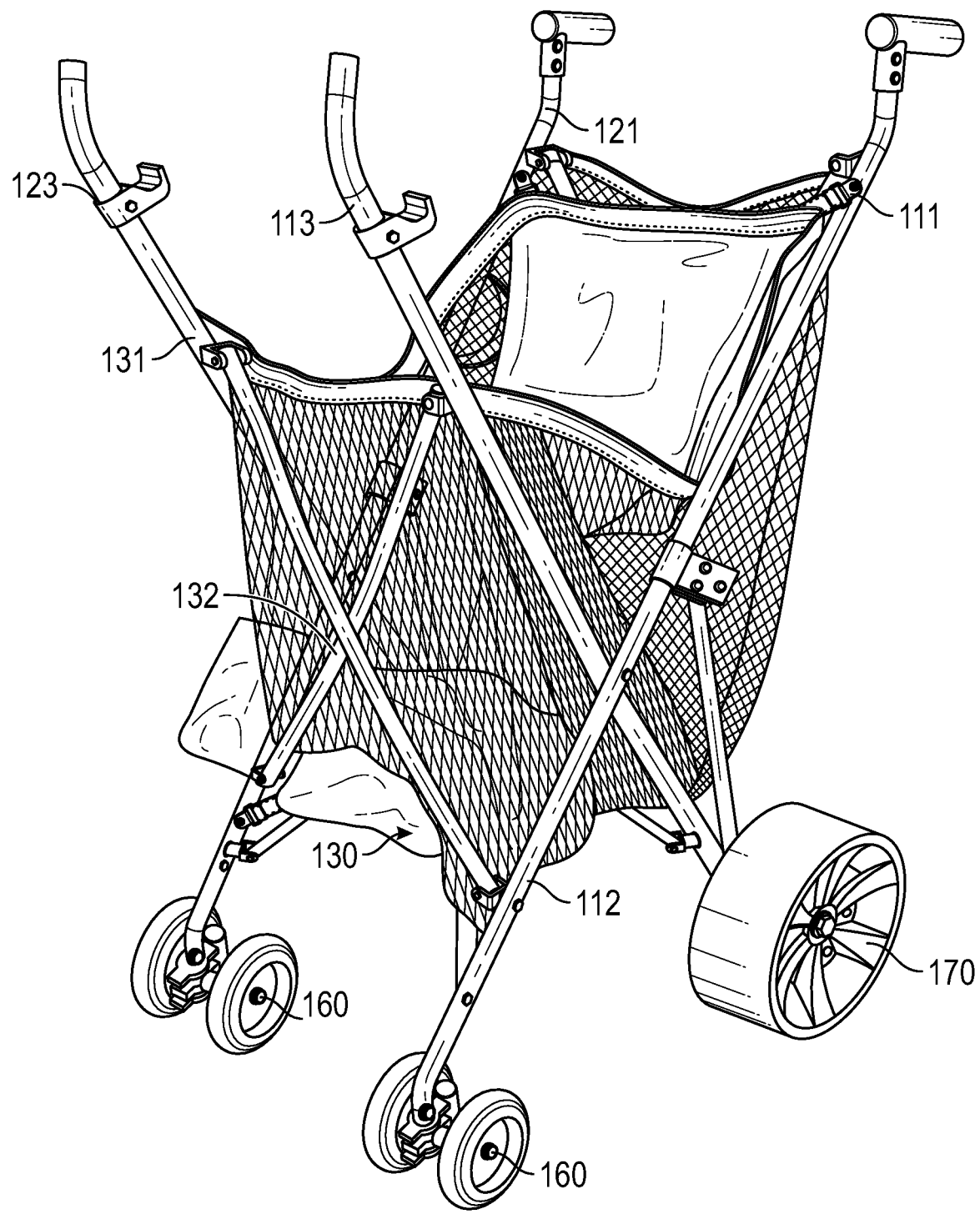
FIG. 6 illustrates the collapsible cart in the present invention that is partially folded.
Figure 7:
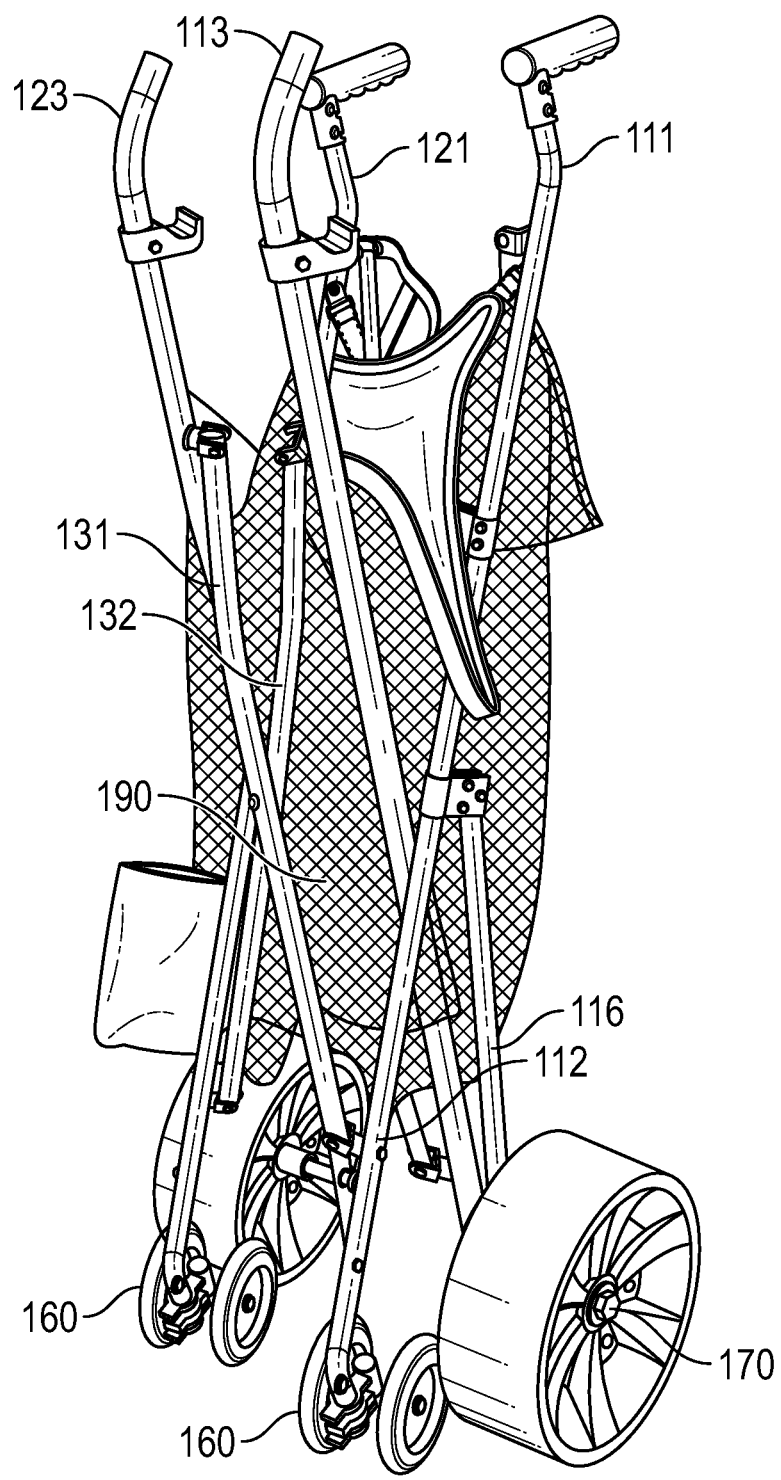
FIG. 7 illustrates the collapsible cart in the present invention that is folded to its minimized size.

When the user finishes using the cart, the size of the cart can be significantly reduced to just occupy a minimum space. More particularly, the structure of the cart starts to collapse when the center unit 155 is pushed down to disengage with one end of the base connecting bars (151 to 154), so the four base connecting bars and the center unit 155 are no longer on the same plane surface as shown in FIG. 5. Also, since the first frame member 110, the second frame member 120, the front spacing member 130, the rear spacing member 140 and the base member 150 are pivotally connected together in most parts, the cart can start to be folded as shown in FIG. 6 when the first and second supporting units move towards the first and second handle units, and meanwhile the first supporting unit 113 and the second supporting unit 123 can move toward each other through the pivotal movement of the front spacing member 130 while the first handle unit 111 and the second handle unit 121 can move toward each other through the pivotal movement of the second spacing member 140 to collapse the receiving space 180. The cart can be fully folded as shown in FIG. 7.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A collapsible cart, comprising:
   a first frame member having an elongated first handle unit, a connecting unit extending from a rear end of the handle unit, and a first supporting unit pivotally connecting to the connecting unit to form an X-shaped structure at a center portion of both the supporting unit and the connecting unit;
   a second frame member having an elongated second handle unit, a connecting unit extending from a rear end of the handle unit, and a second supporting unit pivotally connecting to the connecting unit to form an X-shaped structure at a center portion of both the supporting unit and the connecting unit;
   a front spacing member having a first spacing unit and a second spacing member, which are pivotally connected with each other to form an X-shaped structure at a center portion of both the first and second spacing members;
   a rear spacing member having a first spacing unit and a second spacing member, which are pivotally connected with each other to form an X-shaped structure at a center portion of both the first and second spacing members; and
   a base member having a center unit, a plurality of base connecting bars and a bottom surface,
   wherein the center unit has four openings to pivotally engage with the base connecting bars to position on a plane surface that is parallel to the bottom surface of the base member when the cart is in a fully open status, and the cart starts to collapse when the center unit is pushed down to disengage with the base connecting bars,
   wherein a receiving space is defined by the front spacing member, the rear spacing member, the first frame member and the second frame member when the collapsible cart is fully open; and a fabric is disposed into the receiving space and the fabric is attached to the first frame member and the second frame member respectively, and
   wherein the fabric forms an inclined top opening and two wedge-shaped surfaces, one on the X-shaped structure of the first frame member, and the other on the X-shaped structure of the second frame member.

2. The collapsible cart of claim 1, wherein one end of the first spacing unit of the front spacing member is pivotally connected to an upper portion of the supporting unit of the second frame member and the other end of the first spacing unit of the front spacing member is pivotally connected to a lower portion of the connecting unit of the first frame member.

3. The collapsible cart of claim 1, wherein one end of the second spacing unit of the front spacing member is pivotally connected to an upper portion of the supporting unit of the first frame member and the other end of the first spacing unit of the front spacing member is pivotally connected to a lower portion of the connecting unit of the second frame member.

4. The collapsible cart of claim 1, wherein one end of the first spacing unit of the rear spacing member is pivotally connected to an upper portion of the handle unit of the second frame member and the other end of the first spacing unit of the front spacing member is pivotally connected to a lower portion of the supporting unit of the first frame member.

5. The collapsible cart of claim 1, wherein one end of the second spacing unit of the rear spacing member is pivotally connected to an upper portion of the handle unit of the first frame member and the other end of the first spacing unit of the rear spacing member is pivotally connected to a lower portion of the supporting unit of the second frame member.

* * * * *